Inventor:
Warner W. Schultz,
by Merton D. Morse
His Attorney.

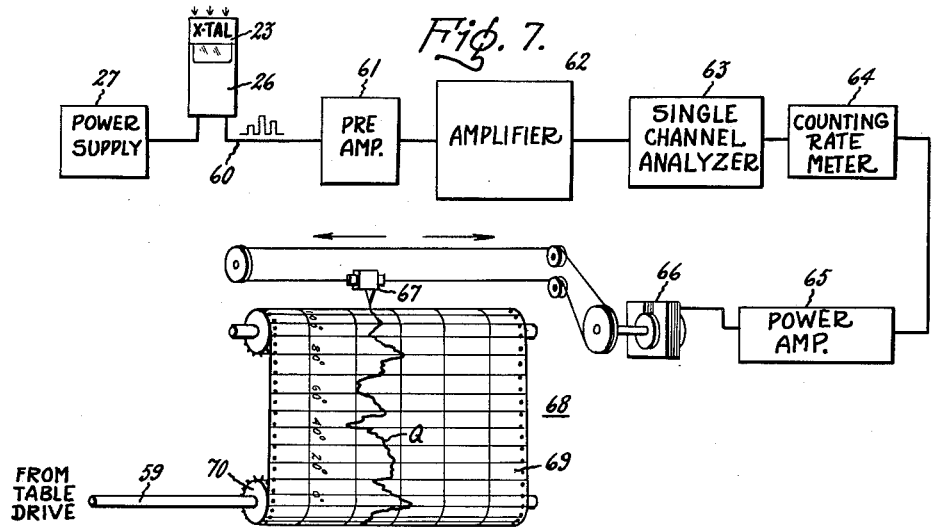
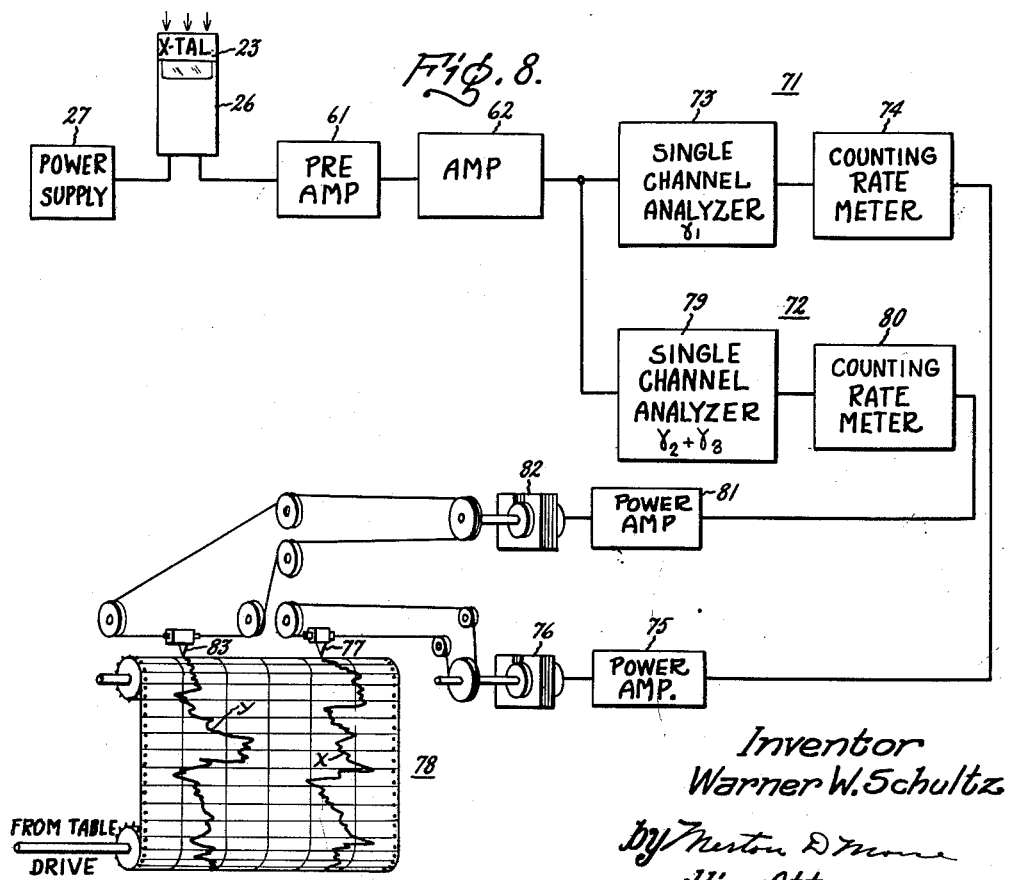

3,025,400
HOMOGENEITY MEASUREMENT
Warner W. Schultz, Schenectady, N.Y., assignor to General Electric Company, a corporation of New York
Filed Oct. 31, 1958, Ser. No. 771,119
12 Claims. (Cl. 250—83.3)

This invention relates to a novel non-destructive test for determining the homogeneity of a mixture of elements.

While it is not intended that the invention be limited to any particular example or embodiment, since the invention is applicable to liquid, gaseous, and solid mixtures, it is most useful with solid phase systems and will be described in connection therewith.

A homogeneous mixture may be defined as a system in which the chemical composition and physical state of any physically small portion is the same as that of any other portion. The tensile strength, resistance to fatigue, stress-strain and other physical characteristics of mixtures such as steel, aluminum, etc., are significantly affected by the manner in which one or more of the constituent elements of the mixture are distributed. Information about the distribution of the constituent elements is of paramount importance where a material such as steel is used in an environment in which it is subject to large static or vibratory stresses since any areas of inhomogeneous distribution are structural weaknesses which may fail under load conditions.

Typically, the problem is very significant in connection with rotating machine elements such as generator rotors, steam turbine rotors, etc., which are often fabricated of manganese steel alloys containing a given percentage of the manganese alloying material ostensibly distributed homogeneously throughout the element. Often, however, the manganese is not homogeneously distributed in the steel thus introducing structural flaws in the rotating element even though no physical discontinuity exists. Under conditions of high rotational speeds and vibration such inhomogeneities may cause the element to rupture or fail. Hence, it is desirable to test the steel to obtain information about its homogeneity before fabrication takes place and without destroying the material in the course of testing.

Hitherto known flaw testing techniques, such as ultrasonic and X-ray flaw detection, are unsatisfactory for homogeneity tests since ultrasonic testing can only detect physically discontinuous flaws, while X-rays are ineffective in detecting either very thin inhomogeneities or elements having an atomic weight and density close to that of the matrix material. To overcome these difficulties and provide a non-destructive homogeneity test is the purpose of the instant invention.

Accordingly, it is an object of this invention to provide a method and apparatus for the non-destructive testing of the homogeneity of a mixture.

A further object of this invention is to provide a method and apparatus for determining the location of inhomogeneities in a metallic alloy.

Yet a further object of this invention is to provide a non-destructive method for determining the homogeneity of a material which utilizes radioactive techniques.

Other objects and advantages of this invention will become apparent as the description thereof proceeds.

To carry out the novel method, a specimen or article to be tested is irradiated by a neutron, or similar charged particle flux, in a manner such that the elements of the mixture specimen are symmetrically activated, i.e., made radioactive, about some arbitrary axis of the specimen. Because of the symmetric nature of the activation, the intensity of radiation from the radioactive elements along any path all points of which are equidistant from the said axis is proportional to the content of that element along the path. By detecting the magnitude of the radiation along a multiplicity of such paths, variations in the content of one or more of the constituent elements over the entire mixture may be easily determined.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIGURE 1 is a perspective view of an irradiated specimen illustrating the paths of activation symmetry;

FIGURES 2, 3, and 4 are curves useful in carrying out the method of the invention;

FIGURE 5 shows a preferred embodiment of an instrumentality for carrying out the novel method;

FIGURE 6 is an end view of the radiation detector mounting shown in FIGURE 5;

FIGURE 7 is a schematic block diagram of an analyzer circuit connected to the output of the radiation detector of FIGURE 5;

FIGURE 8 is an alternative embodiment of an analyzing circuit particularly useful in measuring the depth of the inhomogeneities.

Figure 1:
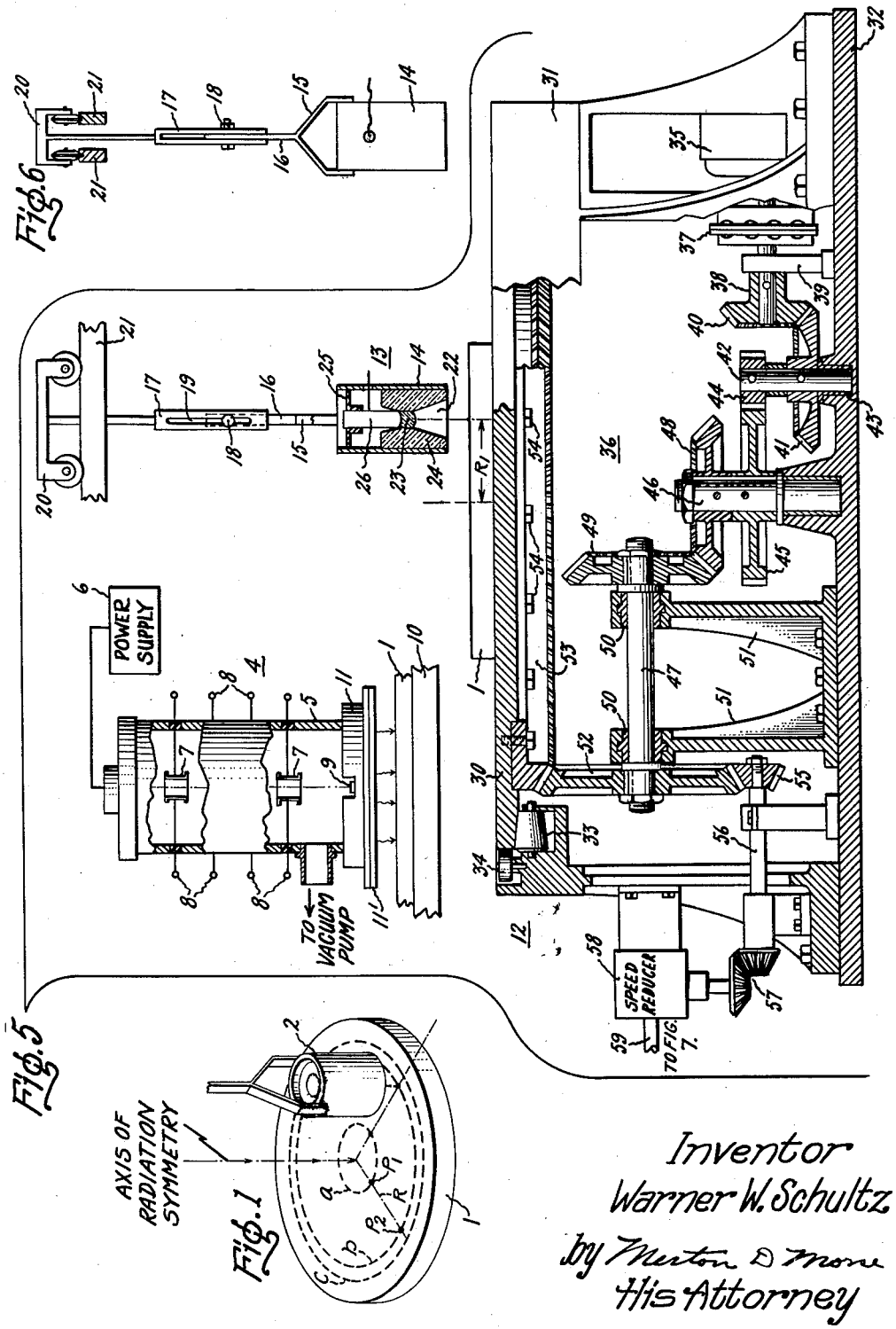

The distribution of the constituent elements throughout a mixture may be determined without destroying the test specimen by rendering one or more of the constituent elements radioactive and detecting the intensity and distribution of the characteristic radiations emitted by the radioactive elements. To this end, a specimen of a mixture of elements may be exposed to a neutron flux, converting the elements, by any one of a number of neutron induced reactions, into radioactive substances which in decaying emit various radiations, such as alpha or beta particles, gamma rays, etc., having energy levels characteristic of the particular radioactive substance. This process of forming radioactive substances by irradiation in neutron or charged particle flux is commonly referred to as activation and the elements rendered radioactive are referred to as activated elements.

For example, if a solid phase mixture such as a manganese-iron alloy is subjected to a thermal neutron flux; that is, neutrons having energies of the order of one-fortieth ($\frac{1}{40}$) of an electron volt, the manganese, and particularly the naturally occurring stable isotope manganese 55, in the alloy is converted by the neutron induced reaction:

$$Mn^{55}(n, \alpha)Mn^{56}$$

to the radioactive isotope manganese 56 which has a half life of 2.59 hours and decays to the stable isotope iron 56 ($Fe^{56}$) with the emission of $\beta$ and gamma rays of three discrete energy levels, i.e., 0.84, 1.8, and 2.1 million electron volts (mev.) respectively.

The variations in intensity of these characteristic discrete energy level gamma rays represent variations in the amount of manganese 55 ($Mn^{55}$) converted to the radioactive isotope manganese 56 ($Mn^{56}$) and thus provide a means for determining the presence, distribution and relative content of manganese in the alloy. This will be true, however, only if all the points on the specimen along which the radiation intensity is measured and compared have been activated equally, that is, subjected to the same magnitude activating neutron flux. The relationship of radiation intensity, element content and neutron flux is defined by the following equation:

$$\left[ A_{t_1} = F\sigma_{\text{act}} N \left( 1 - e^{-\frac{.693 t_1}{T_{1/2}}} \right) \right] \qquad (1)$$

where:
$A_{t_1}$=the radiation intensity or activity in disintegrations per second at any given time $t_1$ after termination of irradiation $F$ = the neutron flux in neutrons per square centimeter per second $\sigma_{act}$ = the cross-section in Barns for thermal activation of an element of a given atomic weight $N$ = the number of atoms in the specimen and is defined by the expression $$N = \frac{n}{m} \times 6.02 \times 10^{23}$$

where $n$ = the weight in grams and $m$ = the atomic weight and the constant in Avogardro's number $t_1$ = a given time in seconds after termination of irradiation $T_{1/2}$ = the half life of the activated element which clearly shows that if the flux density F is constant over a given area or path of the specimen, the radiation intensity $(A_{t_1})$ at a given time $t_1$ is directly proportional to N, the amount of the element in the specimen.

However, as a practical matter, the distribution of a neutron flux is normally neither constant nor symmetrical. As a result, the specimen is not activated uniformly or symmetrically introducing an ambiguity since it cannot then be determined whether the variations in the characteristic radiation intensities are due to a variation in the content of the element or a variation in the degree of activation.

To avoid the inaccuracies and ambiguities introduced by the variations of the neutron flux density it is desirable to activate the specimen symmetrically with respect to an axis thereof so that the degree of activation is constant along a given path on the specimen and the characteristic radiations emanating from the activated element along such a path is a measure of the element content and variations in intensity represent inhomogeneities.

FIGURE 1 of the accompanying drawing illustrated by way of example, a specimen 1, cylindrical in shape, which has been irradiated symmetrically about an arbitrary axis, identified by the legend "axis of irradiation symmetry," producing a multiplicity of concentric paths $a$, $b$, and $c$, etc., each of which has been activated to a known constant degree. Hence, the variations in the characteristic radiation intensity along a given path, measured by means of a radiation detector 2 suspended above the specimen 1, represents variations in content of the element along that path. Furthermore, if some correlation can be established between the degrees of activation for the different paths the radiation intensities at corresponding points $P_1$ and $P_2$, etc., on different paths may be utilized to determine variations in content of the activated element at different points over the entire surface.

A preferred way of irradiating the specimen symmetrically is by producing relative rotational movement between the activating neutron flux and the specimen. Thus, if a specimen, such as the one shown in FIGURE 1, is rotated in the neutron flux, all paths symmetric about the axis of rotation are subjected to an average flux which is constant over any given path but which may vary from path to path. Consequently, the activation of the specimen is symmetric about the axis of rotation and the intensity of the characteristic radiations emitted by the activated element of the specimen along any such path is proportional to the content of the element, and variations in intensity are a measure of the relative content of the element along any path.

Figure 2:
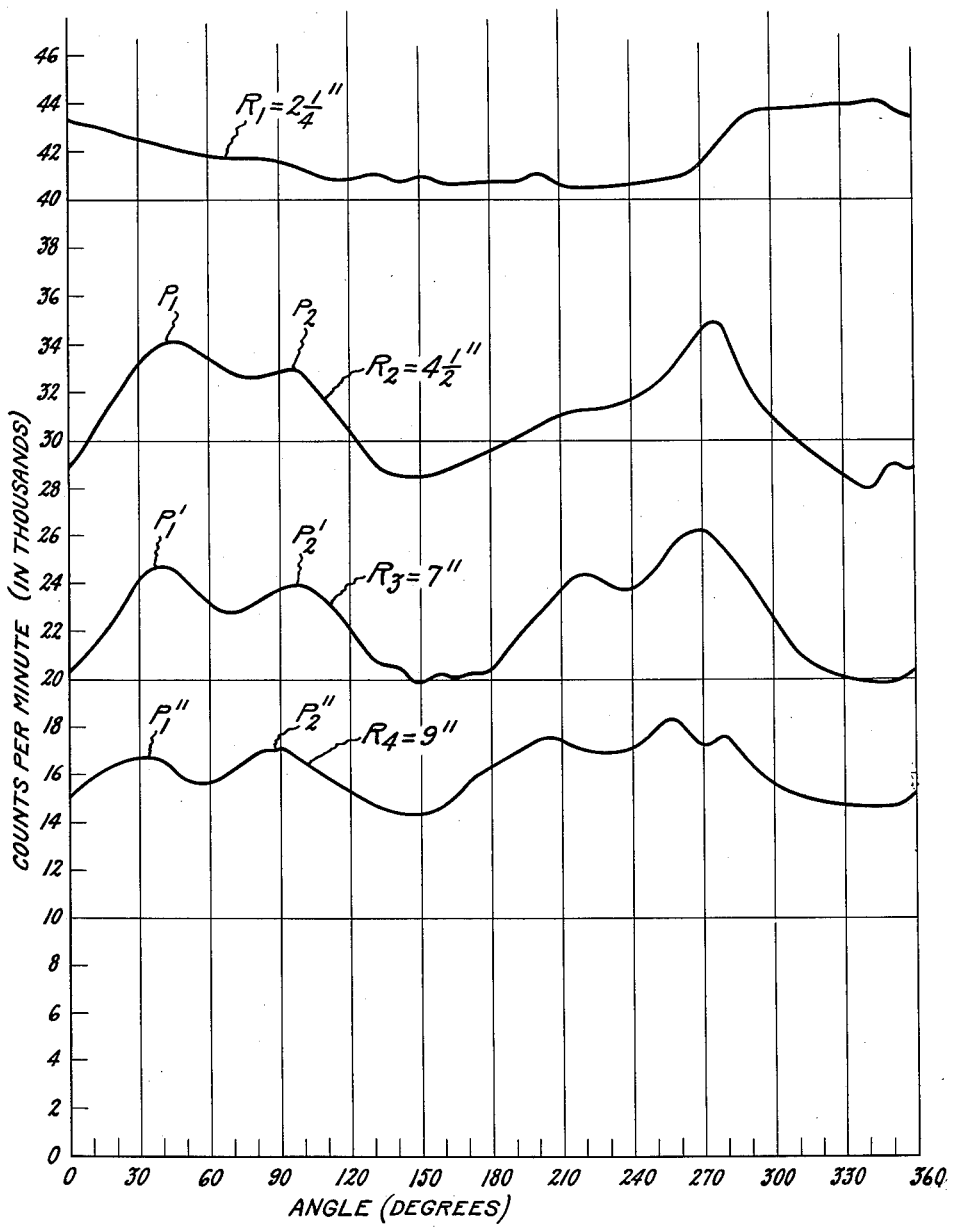

FIGURE 2 illustrated graphically by means of the curves $R_1$, $R_2$, $R_3$, and $R_4$ the variations in radiation intensity along a number of paths spaced different distances (2¼, 4½, 7, 9 inches) from the axis of radiation symmetry. Variations in the radiation intensity, plotted along the ordinate in counts per minute, with distance, plotted along the abscissa in degrees, for any given curve represents variations in the content of the element of the specimen along that path. Thus, it is apparent from curve $R_1$ that the distribution of the element along that path, 2¼ inches from the axis, is not homogeneous, and that a severe condition of inhomogeneity exists along a portion of the path starting approximately at the 270° point and extending for 120° to approximately the 30° point a condition shown by the sharp rise in the counting rate at the 270° point. It is also to be noted from the remaining curves, $R_2$, $R_3$, etc., that the inhomogeneity along the first path, indicated by the sharp rise in counting rate at the 270° point of curve $R_1$, extends radially outward in the specimen since corresponding 270° points of the remaining curves similarly show variations in radiation intensity.

In addition, curves $R_2$—$R_4$ indicate that another portion of the specimen is inhomogeneous in the distribution of one of the constituent elements, a condition indicated by the radiation intensity peaks centered around the 40° and 90° points respectively, and labeled $P_1$, $P_1'$, $P_1''$, $P_2$, $P_2'$, and $P_2''$. From these curves it can be seen that three major inhomogeneities are present in the sample, which constitute flaws and structural weaknesses in the specimen.

It will be noted that the curves $R_1$—$R_4$ illustrated in FIGURE 2 are displaced vertically along the ordinate. This displacement of the curves represents the different degrees of activation along different paths and is due to the fact that, although each path symmetric relative to the axis of rotation is irradiated by an average neutron flux which is constant, the average constant neutron flux is different for different paths. If desired, however, the radiation intensities in counts per minute may be corrected to compensate for neutron flux variations and the curves corrected to vary about the same reference level. To achieve the desired correction known reference quantities of the element to be detected are positioned at various distances from the axis of symmetry, to be irradiated along with the specimen and the activity per unit weight of said element is plotted against distance. Any variation in activity of the reference quantities with distance is thus attributable to variations in neutron flux density and a simple ratio of the activity at any given distance from the axis to the activity at the axis provides a correction factor of the radiation intensity.

Figure 3:
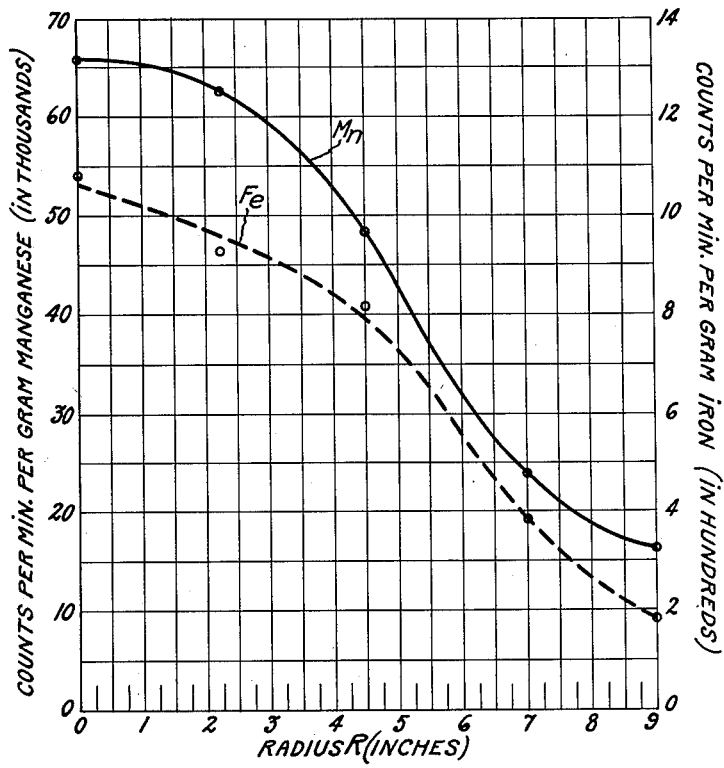

Such a curve is illustrated in FIGURE 3 and identified by the legend "Mn" and shows graphically the variations in radiation intensity, in counts per minute per gram of manganese along the left hand ordinate, with distance from the axis of symmetry, plotted along the abscissa in inches. The ratio $(C_x)$ of the radiation intensity $(A_R)$ at any distance $(R=x)$ from the axis of symmetry to the radiation intensity $(A_{R_0})$ at the axis of symmetry $(R=O)$ provides the desired correction factor $$C_x = \frac{A_x}{A_0}$$

for the radiation intensity readings. By dividing each one of the curves illustrated in FIGURE 2 by the appropriate correction factor $C_x$ obtained from the curve Mn of FIGURE 3 the four curves may be made to vary about the same counting rate reference level whereby variations in the counting rate and hence, the radiation intensity directly represent the variations of the content of the manganese.

In the preceding description, and particularly in connection with its applicability for determining inhomogeneities in a specimen of manganese steel, the activation of the manganese in the alloy has been described in terms of using a thermal neutron flux. In some cases however, it may be desirable in carrying out the method to utilize neutrons of much higher energies. However, in using high energy neutrons the radioactive isotope manganese 56 produced by the neutron activation is no longer exclusively due to transmutation of the stable isotope manganese 55 by the reaction $Mn^{55}(n, \gamma)Mn^{56}$, but may be produced in part by the transmutation of the stable isotope iron ($Fe^{56}$) by the reaction $$Fe^{56}(n, \gamma)Mn^{56}$$

That is, for neutrons of thermal energy, $Fe^{56}$ is not converted to $Mn^{56}$, and for neutrons of energy below 5 mev. the cross-section (i.e., the statistical probability that the reaction will occur) for the conversion of $Fe^{56}$ to $Mn^{56}$ is sufficiently low to make its contribution to the activity statistically insignificant. But for neutrons of higher energy, that is above 5 or 6 mev., the cross-section of $Fe^{56}$ for forming manganese 56 ($Mn^{56}$) is approximately 0.1 of a Barn and as a result a substantial portion of the manganese 56 present in the activated specimen is due to the conversion of iron $Fe^{56}$.

Figure 4:
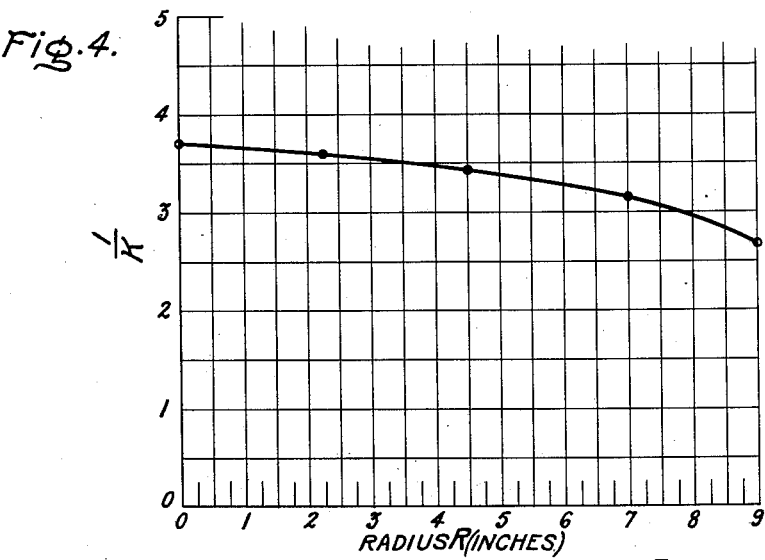

In order to obtain a more accurate evaluation of the fluctuations in manganese content it is consequently necessary to subtract from the measured radiation intensity that portion due to the transmutation of iron to manganese 56. By irradiating, along with the specimen, known quantities of pure iron (Fe) as well as known quantities of pure manganese at various locations from the axis of symmetry the relative activity per gram of manganese and iron respectively, may be determined and the correction factor obtained therefrom. The dashed curve of FIGURE 3, identified by the legend "Fe," shows the variations in radiation intensity per gram of pure iron, plotted along the right hand ordinate in counts per minute per gram of iron, with distance from the axis of symmetry, plotted along the abscissa in inches. From the two curves Mn and Fe of FIGURE 3 a correction factor $1/K$ may be obtained by which the counting rate along any path is multiplied to produce a corrected counting rate which represents substantially only the activity due to the transmutation of $Mn^{55}$ to $Mn^{56}$. A curve of the values of $1/K$ for a given manganese alloy ostensibly containing .7 percent manganese is plotted in the graph of FIGURE 4 wherein values of $1/K$ are plotted along the ordinate and the distances from the axis of radiation symmetry along the abscissa. The curve of FIGURE 4 may be obtained directly from the two curves of FIGURE 3 and may be calculated by means of the formula:

$$\frac{1}{K} = \frac{(1-f)N_{Fe} + fN_{Mn}}{fN_{Mn}} \quad (2)$$

where:

$N_{Mn}$ = the number of counts per minute per gram of manganese at a given distance from the axis $N_{Fe}$ = the number of counts per minute per gram of iron at the corresponding distance from the axis $f$ = the ostensible percentage of the manganese in the alloy $1-f$ = the percentage of iron in the alloy It is apparent from Equation 2 that the values of $1/K$ may be calculated and plotted for various percentage alloys to produce a family of such curves which are useful in correcting the counting rates to compensate for the contribution to the manganese 56 activity by the transmutation of iron. The contribution to $Mn^{56}$ activity due to the transmutation of iron can be subtracted out in this manner because the iron content of the region is very nearly constant (being over 99 percent iron) and the variation in the iron content at any area is smaller than the variation in manganese content at any area approximately by a factor of the ratio of manganese content to iron content, or approximately one part in a hundred. Hence, even should the manganese concentration vary substantially from the presumed value $f$ the corresponding change in the iron concentrations $(1-f)$ is still very minute.

Thus, it can be seen that in the event that the activation of the specimen is carried out by means of high energy neutrons the radiation intensity curves illustrated such as those plotted in FIGURE 2 may be corrected to eliminate therefrom the effects due to the transmutation of iron to $Mn^{56}$.

Referring now to FIGURE 5 of the accompanying drawings there is shown one apparatus for carrying out the steps of the novel method. Thus, the step of irradiating the specimen of the mixture in order to activate selected elements symmetrically may be carried out by positioning a specimen 1 of the mixture in the path of a neutron beam generated by a linear accelerator of Cockroft-Walton type shown generally at 4. The accelerator 4 generated the desired neutron flux by causing a beam of charged particles to impinge on a suitable target. The linear accelerator 4 comprises an evacuated envelope 5 containing a source of deuteron particles positioned at one end thereof, not shown, energized from a suitable source of potential 6 labelled "Power Supply." The beam of deuterons is accelerated down the axis of the envelope 5 by means of a multiplicity of cylindrical accelerating sections 7 which are energized by having direct current accelerating voltages applied to suitable high voltage terminals 8. The accelerating voltages applied to the terminals 8 may be supplied from a suitable high voltage direct current supply, not shown, which customarily includes voltage doubling circuits to provide the necessary high voltages. One typical power supply circuit for this purpose is known as a Cockroft-Walton circuit and is described in detail on pages 249-251 of Nuclear Radiation Physics, by R. E. Lapp and H. L. Andrews, Second Edition, Prentice-Hall, Inc., New York (1954).

The accelerated deuteron beam strikes a tritium target 9 positioned at the opposite end of the housing 4 producing nuclear disintegrations in the target and converting the tritium, which is a heavy hydrogen isotope $H^3$, into helium $He^4$ by the reaction $$H^3(d,n)He^4$$

The conversion of $H^3$ into $He^4$ is accompanied by the emission of neutrons which irradiate the specimen 1. Since both thermal and fast neutrons may be produced from the tritium target a paraffin moderator 11 and a plastic moderator 11' are positioned on the underside of the envelope 5 and surround the target 9 to slow down or thermalize the fast neutrons so that a specimen 1 is irradiated by a thermal neutron beam.

To achieve the symmetric irradiation of the specimen 1 and the symmetric activation of the elements of the specimen, the specimen is supported on a support member or table 10, only partially shown, which table may be rotated by any suitable means, including manual, so that the specimen 1 is rotated at a fixed velocity within the neutron field thus subjecting the specimen to symmetric activation about the axis of the rotation of said specimen.

It is to be understood, and it will be apparent to those skilled in the art, that instrumentalities other than the Cockroft-Walton linear accelerator and the tritium ($H^3$) target illustrated in FIGURE 5, may be utilized to produce the desired neutron flux. For example, a zirconium target having deuterons adsorbed thereon may be used to interact with a deuteron beam to convert the adsorbed deuterons to helium 3 ($He^3$) by means of the $$d(d,n)He^3$$

reaction. Furthermore, cyclotrons, synchrocyclotrons, and various other particle accelerators may be utilized in place of the Cockroft-Walton accelerator to produce a particle beam to interact with a target to produce the neutrons.

Nor is it necessary in carrying out the invention that particle accelerators of any sort be utilized to produce the neutron beam since the neutron activation of a specimen may take place in a nuclear reactor; this approach being limited only by the relative sizes of the specimen and the available area within the reactor. In addition to the above, it is also possible to utilize sealed naturally radioactive neutron sources such as radium-beryllium or polonium-beryllium. It is clear, therefore, that the step of irradiating the specimen in a neutron flux in a manner such that symmetric activation of the specimen takes place, may be carried out by means of many different instrumentalities and devices.

The characteristic radiations from at least one of the elements of the now activated specimen are detected at various points of the specimen to determine the distribution of this element in the specimen. To this end, the symmetrically activated specimen 1 is removed from the neutron flux and positioned so that various portions thereof may be scanned by a radiation detecting instrumentality to determine the intensity of the characteristic radiations emitted by one of the activated elements along various symmetrically activated paths. The specimen 1 is thus positioned on a rotating table assembly 12 beneath a radiation detecting scintillation counter 13 which may be positioned at various distances from the axis of radiation symmetry of the specimen 1 by moving a carriage 20 from which it is suspended along suitable rails 21.

The radiation detector assembly 13 comprises an open ended cylindrical housing 14 supported in a Y-shaped yoke 15, seen most clearly in FIGURE 6. The yoke 15 has a stem portion 16 which is secured in a split guide member 17 by means of a bolt 18 extending through the stem 16 and retained in a pair of vertically extending slots 19 in the guide 17. In this manner the entire housing 14 may be raised or lowered by securing the stem 16 in any desired position within the guide 17.

Positioned within the housing 14 and at the apex of a collimating slit 22 is a thallium activated sodium iodide scintillating crystal 23 surrounded by a lead shield 24 to eliminate background radiation and to insure that only the characteristic radiations, such as gamma rays, from the specimen 1 impinge upon the crystal. The sodium iodide crystal 23, in a well-known manner, produces minute light flashes or scintillations from gamma rays impinging thereon, the intensity of the light scintillations being proportional to the energy of the gamma rays and their rate of occurrence, i.e., the number per unit time, to the intensity of the radiation. Positioned adjacent to one side of the crystal 23 and supported in the housing by means of a bracket 25 is a photomultiplying device 26 which intercepts the scintillation from the crystal and converts them into electrical impulses, the magnitudes of which are thus proportional to the gamma ray energies and the rate of which represent the radiation intensity. Photomultiplying devices of this type are old and well known in the art and need not be discussed here in detail except to point out that they convert the light scintillations from the crystal into electrical impulses.

The table assembly 12 which rotates the activation specimen 1 underneath the radiation detector 13 includes a specimen supporting rotating table 30 which is driven at a constant rotational speed to permit the scanning of a multiplicity of paths, all points of which are equidistant from the center of radiation symmetry. The rotating table 30 is mounted in a frame 31 secured to a base 32 and is supported for rotation in the horizontal plane on a multiplicity of tapered rollers 33 secured to the frame 31. A number of cylindrical rollers 34 rotatable about a vertical axis and also secured to the frame 31 frictionally engage the periphery of the table 30 to permit rotational movement thereof, while yet preventing end play or lateral movement of the table. The table also includes a clamping mechanism, not show, for rigidly securing the specimen 1 to the table during rotation.

The table 30 is driven by a constant speed synchronous motor 35 and a speed reducing gear train indicated generally at 36 at a constant rotational speed. The gear train 36 is so constructed that the speed at which the table is driven is very low, in the order of ⅙ r.p.m. or less, whereby the surface of the sample 1 is slowly scanned by the radiation detector 13. The motor 35 drives a shaft 38 journaled in a bearing mounted in a suitable bearing bracket 39 through a disengaging clutch mechanism 37 retained in a suitable housing supported on the base 32. A bevel gear 40 is secured to the shaft 38 and engages a similar bevel gear 41 fastened to a vertical stub shaft 42 mounted for rotation in a bearing 43 retained in the base 32. Rotation of the shaft 42 by the bevel gears 40 and 41 causes a spur gear 44, also mounted on the shaft 42, to mesh with a corresponding spur gear 45 to transmit motion to a second vertical shaft 46 journaled in a suitable bearing retained in the base 32. In addition to transmitting power from the motor 35 to the shaft 46 the diameters of the gears 40, 41, 44 and 45 are so proportioned that the driving speed is reduced and the shaft 46 is rotated at some desired fraction of the motor driving speed.

The remaining portion of the gear train 36 transmits motion from the shaft 46 with further reduction in speed to the table 30 to drive it and the specimen at the desired constant rotational speed. Thus, rotation of the vertical shaft 46 is transmitted to a horizontal shaft 47 through a pair of bevel gears 48 and 49 which are fixed to the respective shafts. The shaft 47 is journaled in a pair of identical bearings 50 retained in the bearing brackets 51 and drives a bevel gear 52 secured to the other end thereof. Gear 52 engages a large diameter ring gear 53 secured to the underside of the table 30 by means of fastening bolts 54 and drives the table 30 supported on the tapered rollers 33 at a constant low speed.

A bevel gear 55 fastened to a third horizontal shaft 56 is driven by the gear 52 and through a bevel gear assembly 57 and a speed reducing mechanism 58 drives an output shaft 59. The gears 55 and 57 and the speed reducer 58 are so constructed that the output shaft 59 is driven at the same rotational speed as the table 30, and in turn drives the strip chart takeup drive of a suitable strip chart recorder at the same speed as the table 30 so that the output signals from the radiation detecting device 13 suspended above the table may be recorded directly on the chart at various positions corresponding to the rotation of the specimen and the table.

FIGURE 7 illustrates a schematic circuit, in block diagram form, of a gamma ray scintillation spectrometer for measuring and indicating the intensity of the characteristic gamma radiations emitted from the specimen. As was pointed out previously, gamma radiations impinging on the crystal 23 mounted in the housing 14 produce light scintillations, the intensity of which are proportional to the energy of the gamma rays and the number of which per unit time represent the intensity of the gamma radiation. The crystal 23 is positioned adjacent to the photosensitive electrode of a photomultiplying device 26, which, for example, may be a commercially available device such as the RCA 5819 photomultiplier tube, that converts the light scintillations into the variable amplitude output pulses. A regulated high voltage power supply 27 supplies operating voltage for the photomultiplying device 26 which thus produces on the output lead 60 a series of pulses varying in amplitude with the energy of the impinging gamma rays and in frequency with the intensity of the gamma ray radiation. The output pulses on the lead 60 are applied to the input of a preamplifier 61 which amplifies the output pulses from the phototube 26 and applied them to an amplifier 62 for further amplification to produce pulses of a magnitude suitable for analyzing.

The output from the amplifier 62 is applied to a single channel analyzer 63, of well known construction, wherein the pulses are segregated by amplitude and counted to determine the number of pulses of a given amplitude, or range of amplitudes, per unit time. Thus, the analyzer 63 is preset to accept and count only pulses having amplitudes representative of gamma rays of energies in a range extending from 0.84 mev. to 2.1 mev.; the characteristic radiations of manganese 56. By thus adjusting the operating range of the analyzer 63 only the pulse rate of pulses due to gamma rays from manganese 56 is counted. The output of the single channel analyzer 63 is applied to a counting rate meter 64 which produces a varying direct current output proportional to the pulse rate appearing at the input of the single channel analyzer which output is applied to a suitable power amplifier 65 to energize a motor 66 to drive the pen 67 of a strip chart recorder 68.

The recorder 68, illustrated schematically, includes a strip chart 69, a marker pen 67, and a strip chart takeup drive roller 70 which is driven by the shaft 59 at the same speed as the sample table 30. Since the rate at which the strip chart 69 moves is thus equal to the rate of rotation of the table 30, the strip chart may be calibrated directly in degrees of rotation of the specimen along its longitudinal axis and in counts per thousand per minute along the transverse axis. The marker pen 67 thus produces a trace, such as the curve illustrated at C, which is a direct representation of the radiation intensity in counts per minute along a given path of the specimen.

Gamma ray spectrometers such as the one shown in FIGURE 7, including amplifiers 61 and 62, single channel pulse analyzer 63, etc., are old and well known in the art and are commercially available. One such well-known commercially available analyzer is sold by the Radiation Instrument Development Laboratory of Chicago, Illinois, under their Model RIDL–3300 designation.

Having located major inhomogeneities in the manner described, it is also possible, if the inhomogeneity is located beneath the surface of the specimen, to determine the depth of such a flaw by comparing the relative amounts of the three gamma energies received by the detector at the surface of the specimen. That is, the radioactive isotope manganese 56 emits gamma radiations of three distinct energies 0.84 mev., 1.8 mev., and 2.1 mev. ($\gamma_1$, $\gamma_2$, $\gamma_3$). It is also known from the decay scheme of manganese 56 that twice as many 0.84 mev. gammas ($\gamma_1$) are emitted per unit weight as 1.8 and 2.1 mev. gammas ($\gamma_2$, $\gamma_3$) combined. The rate at which these gammas are attenuated or adsorbed by the specimen varies in a predetermined manner both with the thickness of specimen through which the gammas pass and the energy of the gammas. Thus, once an inclusion has been located by an increase in counting rate, the change in the ratio of intensity of 0.84 mev. gammas to the 1.8 and 2.1 mev. gammas provides a measure of the depth of the flaw. Such a method for measuring the depth of a flaw is disclosed and claimed in patent application Serial No. 771,118, Victor V. Verbinski, entitled "Flaw Detection," filed October 31, 1958 concurrently with the instant application and assigned to the assignee of the present invention.

FIGURE 8 illustrates a schematic circuit in block diagram form of a measuring circuit utilized in the above identified co-pending application to determine the depth of such flaws. To this end, a radiation sensitive scintillating crystal 23 again intercepts the gamma radiations and produces light scintillations which are intercepted by a photomultiplier device 26 energized from a highly stable operating voltage power supply 27 to produce at its output a series of pulses the amplitudes of which represent the intensity of the individual gamma radiations and the repetition rate of which represent the intensity of these radiations. The output pulses appearing at the output of the photomultiplier 26 are suitably amplified by means of a preamplifier 61 and amplifier 62 to provide pulses of sufficient amplitude suitable for analyzing. The output pulses appearing at the output of amplifier 62 are segregated in two separate analyzing channels 71 and 72 which are preset in such a manner that channel 71 accepts only pulses representative of the gamma radiation of energies 0.84 mev. whereas channel 72 accepts only pulses in a range representative of gamma radiations having energies of 1.8 and 2.1 mev. respectively.

Thus, channel 71 includes a single channel analyzer 73, similar to that described with reference to FIGURE 7, which accepts only pulses of an amplitude representative of the desired 0.84 mev. gamma rays ($\gamma_1$) and counts the rate of occurrence of these pulses. A counting rate meter 74 coupled to the output of analyzer 71 produces variable direct current output the magnitude of which is proportional to the pulse rate from the analyzer. This output current is applied to a power amplifier 75 to drive a pen motor 76 which actuates the marker pen 77 of one channel of the two-channel strip chart recorder 78 to produce a trace, such as the illustrated curve X, representative of the radiation intensity in counts per minute of the 0.84 mev. gammas.

The channel 72 in a similar fashion includes a single channel analyzer 79 which, however, is preset to accept and count only pulses having magnitudes representative of gamma rays of energies of 1.8 and 2.1 mev. respectively. The output from the analyzer 79 is similarly applied to a counting rate meter 80 which produces an output signal proportional to the pulse rate which is amplified in a power amplifier 81 and drives a pen motor 82 which actuates a marker pen 83 in the second channel of the strip chart recorder 78 to produce upon the strip chart recorder a second trace, such as the curve Y, representing a radiation intensity of the 1.8 and 2.1 mev. gamma rays. From the two curves X and Y it is possible to determine the depth of the flaw due to the inhomogeneous distribution of one of the elements by determining change in the ratio of the intensities of the two groups of gamma rays emitted from the manganese 56 isotope. In this fashion a simple and effective way for locating such flaws beneath the surface of the specimen may be achieved.

As mentioned above, the method of this invention is adapted for measuring the homogeneity of many different types of mixtures including gaseous, liquid, and solid. However, the method of most useful in connection with solid mixtures such as metallic alloys of which manganese steel is typical. The following illustration is set forth, by way of example only and without limiting the scope of the invention, for the purpose of showing how the method may be carried out.

A disc of steel 24 inches in diameter and 3 inches thick, containing, according to the manufacturer's specification, 0.68 percent manganese, was positioned in a neutron flux. The neutron flux was produced by a Cockroft-Walton linear accelerator utilizing a tritium ($H^3$) target. The neutron source was mounted 4 inches above the center of the disc which was rotated about its central axis in the neutron flux to provide symmetric radiation. The disc was thus irradiated for a period of one and one half (1½) hours during which time the neutron flux density at various points along the radius of the disc was measured.

The following table illustrates the relationship of the measured neutron flux at the center of the disc and along the periphery:

| R=0 inches | R=9 inches |
|---|---|
| $10^6$ neutrons/cm.²/sec. | $2.5 \times 10^5$ neutrons/cm.²/sec. |

From the above table it is apparent that the neutron flux varied by an order of 4–1 between the center of the disc and a point nine inches away therefrom. In addition, known quantities of pure manganese and iron were positioned at various distances from the center of the disc and irradiated along with the disc specimen. These reference quantities of the manganese and iron were positioned at various points on the specimen as illustrated in the following table:

|  | Distance R from Axis of Rotation | | | |
|---|---|---|---|---|
|  | 0 in. | 2¼ in. | 4½ in. | 9 in. |
| Manganese (Mn) | x | x | x | x |
| Iron (Fe) | x | x | x | x |

The activity of the manganese and iron reference quantities was then measured in a well type spectrometer to determine the activity in counts per minute per gram of both the iron and manganese and plotted to produce the curves Mn and Fe of FIGURE 3.

After the one and one half hour irradiation, the specimen was scanned by a scintillation counter along circular paths of 2¼, 4½, 7 and 9 inch radii to determine the gamma radiations from the $Mn^{56}$ isotope. The radiation intensity in counts per minute along the various paths was corrected in the manner described previously to compensate for any transmutation of iron 55 into manganese 56 by fast neutrons and the values plotted to produce the four curves of FIGURE 2 which represent reading from the top the radiation intensity of the manganese along the 2¼, 4½, 7 and 9 inch paths.

The resultant data as plotted in the curves of FIGURE 2 illustrated clearly that the test specimen, which according to the manufacturer's specification contains .68 percent manganese homogeneously distributed, actually included gross variations in the manganese content. Furthermore, the location of these major inhomogeneities in the test specimen are apparent from the curves illustrated in FIGURE 2.

In describing the novel method, neutron activation has been discussed as possibly the most useful mechanism for producing the radioactive isotopes. It is apparent however, that nuclear particles other than neutrons may be utilized to activate the specimen. Thus, depending on the mixture and the nature of its constituent elements, for example, charged particles such as protons, deuterons, and alphas, may be used to activate a specimen. It must be realized, however, that in utilizing such other particles that their penetrating power as a rule is much lower than that of neutrons and, hence, their utility may be limited if the specimen to be examined is thick since only the surface of the specimen will be activated. On the other hand, this very quality may be useful in circumstances where very thin specimens are to be examined or where the condition of the surface layer is of interest. However, it is to be understood that the instant invention is not limited to the use of neutrons to produce the activation of the specimen.

Furthermore, in discussing the preferred embodiment of the invention the characteristic gamma radiation from the isotopes were used to determine the distribution of the elements. It is obvious, however, that nuclear particles such as alphas, betas, etc., from the isotopes may also be utilized in carrying out the method of the invention. Although gamma radiations are preferred because of their high penetrating powers and discrete energy levels, it is to be understood that this invention is not limited thereto since the other nuclear particles referred to above may be utilized to identify and measure the activated element.

In addition, in measuring the homogeneity of a mixture such as a manganese alloy, it is fortunate that manganese is such a convenient element in terms of the gamma rays emission and the short half life which limits radiation hazards. However, in some circumstances it may be desirable to measure and determine the homogeneity of a mixture which does not contain an element as favorable for activation as manganese. In such cases the instant invention may still be carried out by adding a small known quantity of either manganese or of even a more favorable element, such as dyprosium or dyprosium oxide, for example, to the melt of an alloy, or any other mixture such as powders, or ceramics, so that these elements distribute themselves generally through the mixture in the same manner as the element about which the information is desired. Then in the course of irradiation these added elements are activated and by measuring and determining their distribution corresponding information about the remaining element may be obtained since it is probable that the remaining element is distributed generally in the same manner as the added element. In this manner the instant method for determining homogeneity has its usefulness greatly extended.

While a particular embodiment of the invention has been described and shown, it will, of course, be understood that it is not limited thereto since many modifications and variations in the method and the circuit arrangements and instrumentalities for carrying out the method may be made. It is contemplated that the appended claims cover any such modifications as fall within the true spirit and scope of this invention.

What I claim as new and desire to secure by Letters Patent of the United States is,

1. In a non-destructive method for testing the homogeneity of a solid mixture of elements, the steps of irradiating the mixture symmetrically including subjecting it to a particle flux which is symmetrically distributed about an arbitrary axis to activate and form radioactive elements from the constituents of said mixture, which elements emit characteristic penetrating radiations, detecting and measuring the characteristic radiations from at least one of the activated elements at various locations in the mixture located symmetrically about said arbirary axis to determine the distribution of said elements and the mixture homogeneity.

2. In a non-destructive test of the homogeneity of a solid mixture, the steps of irradiating the mixture symmetrically in a particle flux including the steps of rotating a specimen of the mixture in the flux to activate the constituent elements of the mixture symmetrically and form radioisotopes therefrom which emit characteristic radiations, detecting and measuring the characteristic radiations from at least one of the isotopes formed by irradiation over various paths which are symmetrically irradiated to determine the distribution of said elements and the mixture homogeneity.

3. A non-destructive testing method for determining the homogeneity of a mixture of elements, comprising the steps of irradiating a solid specimen of the mixture with a neutron flux which is symmetrically distributed about a given axis of the specimen, said irradiation activating the constituent elements of the specimen to form radioactive elements therefrom which emit characteristic penetrating radiations, detecting and measuring the penetrating radiations from one of the activated elements at various locations about the axis of radiation symmetry to determine the distribution of said element and the homogeneity of said specimen.

4. A non-destructive testing method for determining the homogeneity of specimen constituted of a mixture of elements, comprising the steps of neutron irradiating a specimen symmetrically about an axis of rotation of the specimen to activate the constituent elements symmetrically about said axis and form radioactive elements therefrom which emit characteristic penetrating radiations, detecting and measuring the magnitude of the penetrative radiation of one of said elements at various locations about said axis to determine the relative magnitudes and distribution of said element about said axis whereby the homogeneity of the specimen may be determined.

5. In a non-destructive testing method for determining the homogeneity of a metallic alloy, the steps of symmetrically activating the constituent elements of a specimen of the alloy including the steps of irradiating the specimen in a neutron flux to form radioactive elements from the specimen constituents, which radioactive elements emit characteristic penetrating radiations, rotating said specimen in said neutron flux to cause said activation to be symmetrical about the axis of rotation, detecting and measuring the magnitude of the penetrating radiation from one of the radioactive elements to determine the distribution of one of the alloying constituent element whereby the homogeneity of the specimen may be determined.

6. In a non-destructible testing method for determining the homogeneity of a manganese steel alloy, the steps of symmetrically irradiating a specimen of manganese steel in a thermal nuetron flux of such energy level that the manganese in the specimen is activated to form the isotope $Mn^{56}$ from $Mn^{55}$ while minimizing the formation of $Mn^{56}$ from the iron $Fe^{56}$ in said specimen, measuring and detecting the characteristic penetrative radiation of $Mn^{56}$ to determine the distribution of manganese in the specimen.

7. A non-destructive method for testing the homogeneity of a mixture of elements, comprising the steps of symmetrically irradiating a specimen of the mixture to activate the constituent elements of the mixture causing them to emit characteristic penetrative radiations, detecting and measuring the penetrative radiations from one of said constituent elements over at least one selected path on said specimen to determine variations in intensity of the penetrative radiations along said path as an index of the quantity of said element whereby the distribution of said element in said specimen may be determined.

8. A non-destructive method for testing the homogeneity of a mixture of elements, comprising the steps of irradiating a specimen to be tested to activate the constituent elements of said mixture symmetrically about a selected axis of the specimen causing them to emit characteristic penetrating radiations, detecting and measuring the penetrating radiations from one of said constituent elements at various distances from the axis of symmetry to determine the distribution of the element in said specimen and the variations in the specimen homogeneity.

9. In a non-destructive method for testing the homogeneity of a mixture of elements, the steps of irradiating a specimen of the mixture to activate constituent elements of the specimen symmetrically about a selected specimen axis causing the activated elements to emit characteristic penetrating radiations, whereby variations in radiation intensity in any path equidistant from said axis represent variations in the content of said constituent element, detecting and measuring the intensity of the radiations from one of said elements along at least one path all points of which are equidistant from said axis to determine the distribution of said element along said path and the specimen homogeneity.

10. In a non-destructive method for testing the homogeneity of a mixture of elements, the steps of irradiating a specimen of the mixture to activate constituent elements of the specimen symmetrically about a selected axis of the specimen so that the activated elements emit characteristic penetrating radiations whereby variations in radiation intensity in any path equidistant from said axis represents variations in the content of said constituent elements, detecting and measuring the intensity of the characteristic radiations from one of the elements in said specimens along a multiplicity of paths located at different fixed distances from said axis, all points on each path being equidistant from said axis whereby the distribution of said element along a given path and at corresponding points on different paths may be determined.

11. In a non-destructive method for testing the homogeneity of a mixture of elements, the steps of irradiating a specimen to be tested about a selected specimen axis to activate constituent elements of the specimen symmetrically about said axis causing them to emit characteristic penetrating radiations whereby variations in radiation intensity in any path equidistant from said axis represents variations in the content of said constituent element, detecting and measuring the intensity of the characteristic radiations from one of said elements along a first path all points of which are equidistant from said axis, detecting and measuring at a subsequent time the characteristic radiation from said one element along at least one more equidistant path located a different distance from said axis than said first path, whereby the distribution of said element along said paths and at corresponding points on different paths may be determined.

12. In a non-destructive method for determining the homogeneity of a mixture of elements, the steps of irradiating a specimen of said mixture to activate constituent elements of the mixture specimen symmetrically about an axis thereof to cause the elements to emit characteristic penetrating radiations, detecting and measuring the characteristic radiations from one of said elements along a first path all points of which are equidistant from said axis including the steps of rotating the specimen about said axis with respect to a fixed radiation detector, and detecting and measuring the characteristic radiations from said element at least one more time along another path all points of which are also equidistant from said axis whereby the distribution of said element may be determined.

References Cited in the file of this patent

UNITED STATES PATENTS

| | | |
|---|---|---|
| 2,452,045 | Friedman | Oct. 26, 1948 |
| 2,509,344 | Herzog | May 30, 1950 |
| 2,805,340 | Lewis | Sept. 3, 1957 |
| 2,914,676 | Dijkstra et al. | Nov. 24, 1959 |

OTHER REFERENCES

Recent Advances in Radioactivation Analysis, by A. A. Smales, from Peaceful Uses of Atomic Energy, United Nations Publication, 1956, vol. 15, pages 73–77.